United States Patent

[11] 3,572,733

[72] Inventors  Werner E. Howald
               Cincinnati;
               Thomas L. Hampton, Loveland, Ohio
[21] Appl. No. 788,406
[22] Filed     Jan. 2, 1969
[45] Patented  Mar. 30, 1971
[73] Assignee  General Electric Company

[54] SHAFT SEAL USED IN GAS TURBINE ENGINES
     5 Claims, 4 Drawing Figs.
[52] U.S. Cl. .................................................. 277/173,
                                           277/178, 285/158
[51] Int. Cl. ..................................................... F16j 9/00,
                                                     F16r 41/00
[50] Field of Search ............................................ 277/174,
                                           173, 53, 178; 285/158

[56]              References Cited
             UNITED STATES PATENTS
2,015,233   9/1935   Pfleger ......................... 277/174
2,813,692  11/1957   Bremer et al. ................. 285/158X
2,951,448   9/1960   Rushing ........................ 277/174X Primary Examiner—Samuel B. Rothberg
Attorneys—Derek P. Lawrence, L. H. Sachs, E. S. Lee, III,
  Frank L. Neuhauser and Oscar B. Waddell ABSTRACT: In a gas turbine engine an improved seal is provided for a shaft or the like projecting through a duct wall which defines a gas stream flow path. Two forms of seal are shown. Each provides, through the use of a sleeve, sealed axial movement and sealed lateral movement (in a normal plane) between the shaft and the duct wall. An effective seal is provided which accommodates differential thermal growth without stressing the components.

PATENTED MAR 30 1971 3,572,733
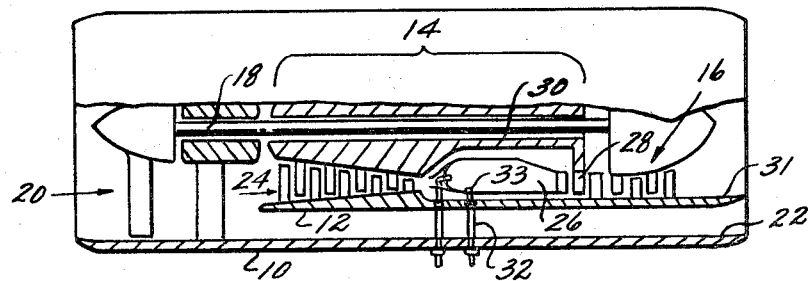
Fig 1
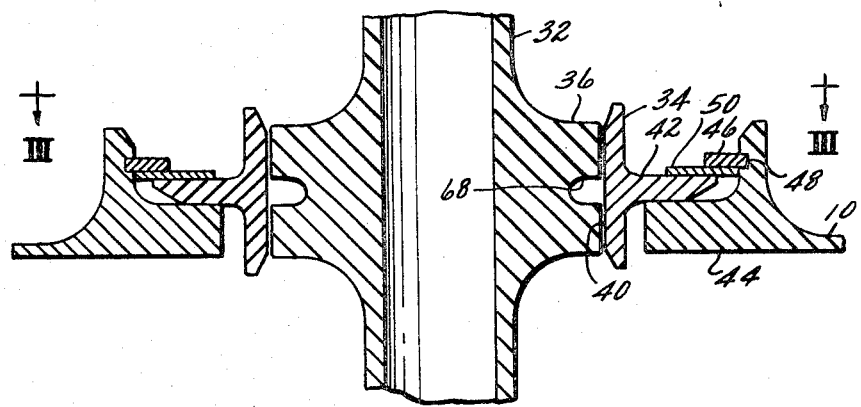
Fig 2
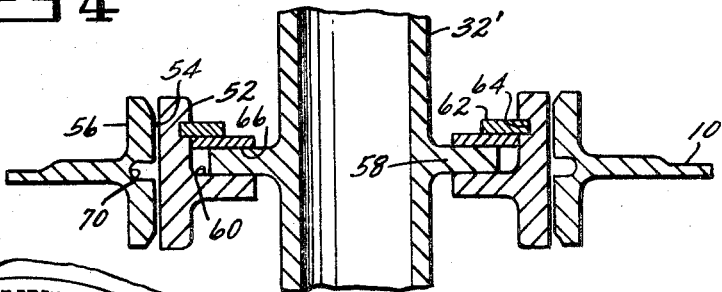
Fig 4
Fig 3
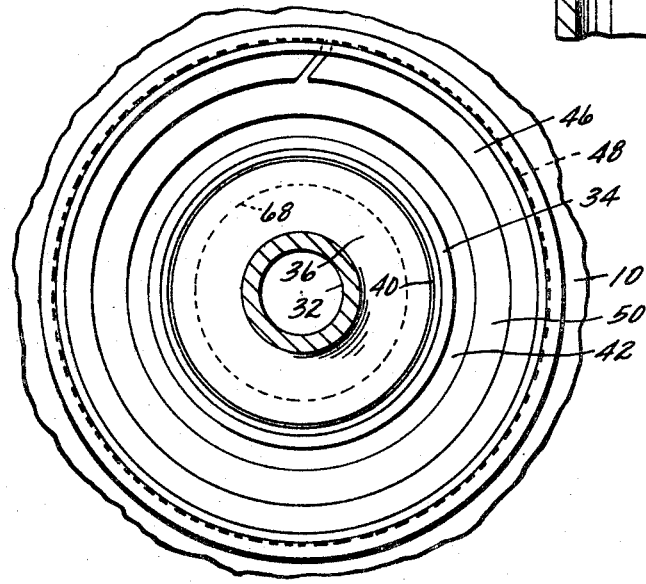
INVENTORS.
WERNER E. HOWALD
THOMAS L. HAMPTON
ATTORNEY

SHAFT SEAL USED IN GAS TURBINE ENGINES

The present invention relates to improvements in gas turbine engines, and, more particularly, to improvements in sealing access tubes which must cross flow duct walls which have different rates of thermal growth caused by changes in the temperature of their operating environment.

In several types of gas turbine engines, duct walls defining a gas flow path must be traversed, or spanned, by tubes or conduits to provide communication between an interior portion of the engine and an exterior portion of the engine. Since these duct walls define the flow path for an air, or hot gas, stream, it is vital that there be a minimum of air or gas leakage at the juncture points between the duct walls and the conduit or shaft. The problem becomes more complicated in that one or both ends of such a tube or shaft may be connected to a frame or other relatively fixed structural member and the duct walls can be displaced by thermal expansion, both radially inwardly and outwardly, as well as axially, in either a forward or rearward direction. If such shafts were rigidly clamped to the duct wall to provide a gas seal at this juncture, high stresses would be imposed on the components or complicated connections in the structural elements involved.

Accordingly, one object of the invention is to provide an effective seal for a shaft or the like, projecting through one or more duct wall defining the flow path of a gas stream in a gas turbine engine.

The objects are attained, in a gas turbine engine having a shaft projecting through a duct wall, by the provision of a shaft seal comprising s sleeve telescoped over the shaft at the duct wall. The sleeve is provided with means for maintaining sealing engagement with the shaft and duct wall in an axial direction of relative movement of the shaft relative to the duct wall and in any direction in a plane normal to the axis of the shaft. In one form, the sleeve forms a circumferential seal with the shaft to accommodate axial movement and circumferential flange sealing means accommodate movement in a plane normal to the axis of the shaft. In another form of the invention the sleeve forms a circumferential seal with the duct wall and circumferential flange sealing means accommodate movement in a plane normal to the axis of the shaft.

Where the shaft projects through duct walls defining an annular flow path and is relatively fixed at one or both ends, it is advantageous that the same sealing connection be employed in both duct walls.

The above and other related objects and features of the invention will be apparent from a reading of the following description of the disclosure found in the accompanying drawing and the novelty thereof pointed out in the appended claims.

In the drawing:

FIG. 1 illustrates a turbofan engine in which the present invention is embodied;

FIG. 2 is an enlarged portion, in section, of FIG. 1 showing one embodiment of the present invention;

FIG. 3 is a section, on a reduced scale, taken on line III–III in FIG. 2; and

FIG. 4 is a section, similar to FIG. 2, illustrating an alternate embodiment of the invention.

FIG. 1 illustrates, in simplified form, a turbofan engine as used in the propulsion of aircraft. This engine comprises an outer casing or duct wall 10 and an inner duct wall 12. A core engine 14 disposed within the duct wall 12 generates a hot gas stream for driving a fan turbine 16. This turbine is connected by a shaft 18 to a bladed rotor or fan 20 which pressurizes an air stream. The outer annular portion of this air stream passes between the duct walls 10 and 12 and is discharged from a propulsive nozzle 22 to provide a propulsive force. The inner portion of the air stream, pressurized by the fan 20, is further pressurized by a compressor 24 of the core engine 14 to support combustion of fuel in a core engine combustor 26. This hot gas stream then drives a core engine turbine 28 connected through a shaft 30 to the core engine compressor 24. After driving the turbine 28, the hot gas stream then drives the fan rotor 16, as previously described, and is discharged through a propulsive nozzle 31.

Various structural support means can and have been devised to mount the described, basic turbofan components relative to one another and the engine as a whole to an aircraft frame. However, it will be apparent that due to the temperature differentials between the air stream passing between the duct walls 10 and 12 and the temperature of the core engine within the duct wall 12 that there will be differential thermal expansion between the duct walls in both radial and axial directions, differential radial growth is, however the primary factor.

In many instances, it is necessary or desirable to provide a shaft which traverses the duct walls 10 and 12, as for example, the illustrated hollow shaft or tube 32 which houses electrical leads to an igniter 33 for fuel to be burned within the combustor 26. FIGS. 2 and 3 illustrate a shaft seal for the shaft 32 at the duct wall 10. This seal comprises a sleeve 34 which is telescoped over the shaft 32. A collar 36 is formed integrally with the shaft 32 and is received with a small tolerance within the central base 40, of the sleeve 32. This base provides an effective circumferential gas seal between the shaft 32 and sleeve 34. A circumferential flange 42 extends outwardly of the sleeve 34. The lower surface of this flange engages a boss 44 on the duct wall 10. A retaining ring 46 is resiliently engaged in a groove 48 (in the boss 44) to maintain a sealing ring 50 in engagement with the upper surface of the flange 42. It will be noted that the boss is widely spaced from the sleeve 34 in a radial sense to permit relative movement between the sleeve and the duct wall in a plane normal to the axis of shaft 32 while an effective gas seal is maintained by one or both of the radial surfaces of the flange 42.

The described seal prevents significant gas leakage through the duct wall 10 while at the same time permitting free relative movement between the shaft and the duct wall and the shaft 32 in an axial direction (relative to the shaft) and in any direction in a plane normal to the shaft axis. Such relative movement accommodates the complicated differential thermal growths existing in this environment without imposing any significant stresses on the duct wall, the shaft or any components connected thereto.

These same advantages are derived from the alternate embodiment of the invention seen in FIG. 4. In that FIG, a sleeve 52 is telescoped over a modified shaft 32'. The outer diameter of the sleeve 52 forms a circumferential gas seal with a base 54 formed in a boss 56 which is mounted on the duct wall 10. This seal accommodates the referenced axial movement.

A flange 58 is formed integrally with the shaft 32'. The lower surface of this flange engages a seat 60 formed within the sleeve 52. A retainer ring 62, engaging a groove 64 holds a sealing ring 66 in engagement with the upper surface of the flange 58. Proper clearances are provided to permit the referenced relative movement in a plane normal to the axis of the shaft while an effective gas seal is maintained by one or both of the radial faces of the flange 58.

The embodiment of FIG. 4 has the further advantage that the sealing sleeve may be removed with the shaft. This feature is helpful in maintenance and repair of the seal.

Where a shaft projects through two duct walls, as illustrated in FIG. 1, it is preferable to use the described shaft seals at the juncture of the shaft with each duct wall.

It is well known that gas seals can take many forms. In some cases there is a small clearance between two cylindrical parts as in the case of the described circumferential seals. The effectiveness of such seals is made more effective by grooves 68, 70 seen in FIGS. 2 and 4, respectively. In other cases there is actual rubbing contact between the sealing surfaces as in the case of the described flange sealing means. In any event the invention contemplates different types of gas seals for the purposes described as well as other modifications of the illustrative embodiments disclosed. The scope of the present inventive concepts is therefore to be derived solely from the appended claims.

We claim:

1. A gas turbine engine having:

a duct wall defining a gas flow path;

a shaft projecting through said wall and movable, relative thereto in both an axial direction and in a direction normal to its axis, a sleeve telescoped over said shaft; and relatively movable sealing means between said duct and sleeve and between said sleeve and shaft for preventing flow into or out of the gas flow path while permitting said relative axial and normal movement between the shaft and duct.

2. A gas turbine engine as in claim 1 wherein:

the sealing means permitting relative axial movement comprises a bore through the sleeve; and the sealing means permitting relative movement in the normal direction comprise radial annular surfaces formed on the sleeve and duct.

3. A gas turbine engine as in claim 2 wherein:

the shaft has an enlarged collar received by the sleeve bore to cooperatively form the sealing means for axial movement; and the sleeve has a circumferential flange projecting outwardly to form one of said annular surfaces on one radial face thereof and a boss on the duct wall having the other annular surface which engages said sleeve annular surface, and a sealing ring, also mounted on said boss, engages the opposite radial face of the flange to cooperatively form the sealing means, permitting relative movement in a normal direction.

4. A gas turbine engine as in claim 1 wherein:

a boss is provided on the duct wall with a bore surrounding said sleeve and the sleeve has a cylindrical surface cooperating with said bore to form the sealing means permitting relative movement in an axial direction; and the sealing means permitting relative movement in the normal direction comprise radial annular surfaces formed on said sleeve and shaft.

5. A gas turbine engine as in claim 4 wherein the shaft has a circumferential flange providing, on one face, one of said radial annular surfaces and the sleeve has a matching seat providing the other radial annular surface and a sealing ring, mounted on the sleeve, engages the other radial face of the shaft flange.